J. E. HOY & R. P. PLACE.
GRINDING WHEEL DRESSER.
APPLICATION FILED MAR. 7, 1918.

1,276,366.

Patented Aug. 20, 1918.

Witness

Inventor
John E. Hoy and
Roland P. Place,
By Pagelsen & Spencer
Attorneys

UNITED STATES PATENT OFFICE.

JOHN E. HOY AND ROLAND P. PLACE, OF DETROIT, MICHIGAN.

GRINDING-WHEEL DRESSER.

1,276,366.            Specification of Letters Patent.     Patented Aug. 20, 1918.

Application filed March 7, 1918. Serial No. 220,975.

*To all whom it may concern:*

Be it known that we, JOHN E. HOY and ROLAND P. PLACE, citizens of the United States, and residing at Detroit, county of Wayne, and State of Michigan, have invented a new and Improved Grinding-Wheel Dresser, of which the following is a specification.

In the dressing of the worn surfaces of grinding wheels it has been the custom to some extent to use a series of toothed disks clamped together and arranged to contact with the face of the grinding wheel and be driven thereby, and the present invention relates to dressing tools of this class.

One object of the invention is to provide a tool wherein a much longer and more uniform service may be obtained from the teeth than heretofore.

Another object is to provide a tool wherein the disks are assembled in reference to each other in such manner that the teeth thereon form spirals about the axis around which they turn, and wherein separation of each tooth from the adjacent teeth of adjoining disks sufficiently to allow an efficient dressing action is insured.

Another object is to provide a dresser whereby the face of a grinding wheel may be dressed across its entire width without interfering with projecting elements on the machine of which the wheel is a part. The invention also aims to provide a tool which may be used to dress the faces of the grinding wheel close up to the clamping elements whereby the wheel is supported.

Another object is to provide a tool wherein dust is effectually excluded from the bearing surfaces.

In attaining these and other objects the nature of which will appear later, the invention consists in a cutter made up of metal disks having teeth of substantially uniform cross-section from point to base; in a series of duplicate toothed disks assembled on a spool, the disks and spool having coöperating means whereby each disk is positively spaced about the axis of the spool and in reference to the adjoining disks an amount greater than the circumferential width of a tooth; in a dresser tool mounted on a spindle which is supported at one end only; in a dressing implement including a hood having an open end and a closed end and having therein a rotatable tool supported from the closed end. The invention further consists in the details of construction shown, described and claimed.

Figure 1:
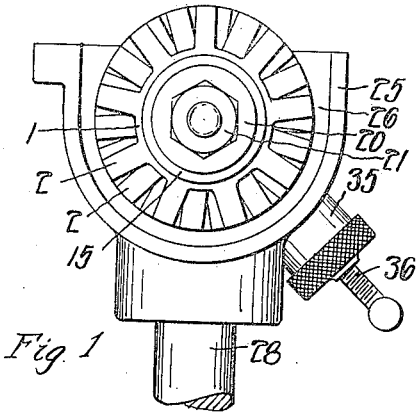
Figure 2:
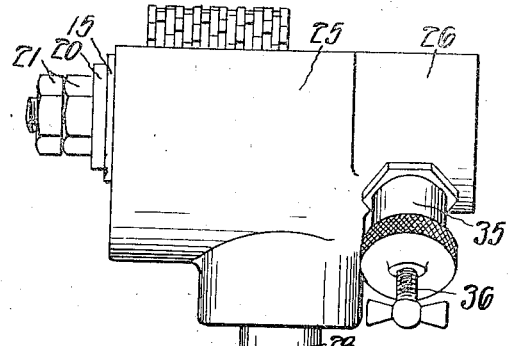
Figure 4:
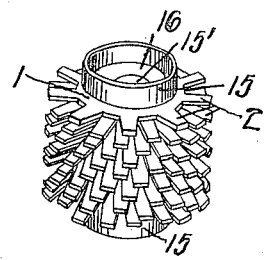
Figure 3:
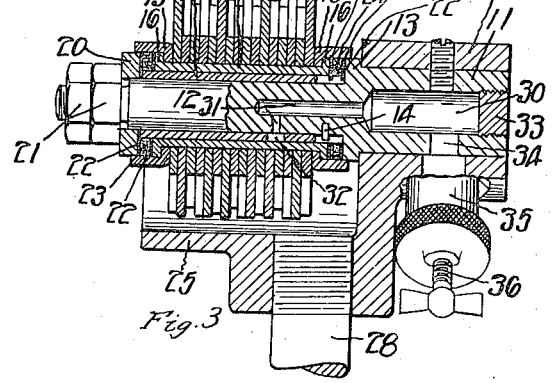
Figures 8, 9:
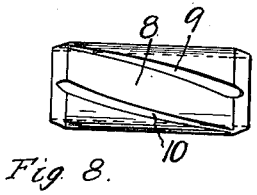
Figure 5:
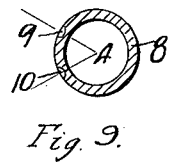
Figures 6, 7, 10:
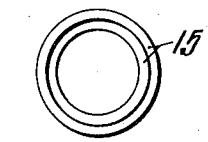
Figure 11:
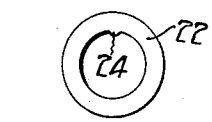
Figure 12:
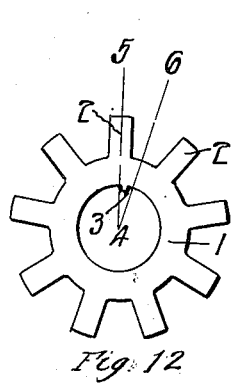

In the drawings, Figure 1 is an end view showing a preferred embodiment of the invention. Fig. 2 is a view looking from the right in Fig. 1. Fig. 3 is a central longitudinal section corresponding to Fig. 2. Fig. 4 is a side view of the cutters in place on the spool. Fig. 5 is a side view of the spindle. Figs. 6 and 7 are, respectively, a side view and an end view of the spindle bushing. Figs. 8 and 9 are, respectively, a side view and a transverse section showing the spool forming member before its ends are flanged about the cup-shaped bearing housings. Figs. 10, 11 and 12 are end views of the bearing housings, the washers and the cutters.

Considering first the cutter, it will be seen to be made up of a plurality of thin metal disks 1 including the uniformly spaced teeth 2 that are of substantially uniform cross section throughout. These disks are perforated and from the wall of the openings of each a small point or projection 3 extends inwardly, as shown in Fig. 12. Preferably this projection 3 lies intermediate between the line 4—5, which is the radial center line of one of the teeth, and the line 4—6 which bisects the angle between the line 4—5 and the corresponding line of the adjacent tooth, although it might be positioned otherwise. Enough of these disks to form a cutter of the desired width are assembled on a tubular member 8 (Fig. 8) the outer surface of which is grooved helically at 9 and 10 to receive the projections 3.

In the construction shown, there are two of these grooves, and the angle 9—4—10 (Fig. 9) is made preferably greater than the angle between the center lines of adjacent teeth 2 (or greater or at least different than any multiple thereof) by a predetermined amount, which is equal to the desired angular offset between corresponding teeth of adjacent disks. Then by assembling the disks with like sides all facing toward a single end of the cutter and with the projections 3 alternately received in the grooves 9 and 10, it is evident that the teeth will be properly spaced from each other and that they will form helices of the same pitch as the grooves. On the other hand, were the duplicate disks assembled with the projections received in a single groove, the necessary spacing of the teeth whereby each is separated from adjacent teeth throughout a considerable portion of its depth could not be secured although their end faces would present helices of the same pitch as the grooves. In other words, although the grooves in the present case are of slight pitch, the teeth are spaced considerably from one another.

When the disks are assembled on the member 8 as above set forth a cup-shaped housing element 15 is positioned at each end and the ends of the member 8 are pressed over to from flanges 16 whereby the parts are rigidly held in proper relation to one another. The working element thus constructed may be mounted in different ways but in order to provide a tool which may interfere to the least possible extent with parts of the grinding machine adjacent the wheel which is to be dressed, it is preferred to mount it on a spindle which is supported from one end only. The spindle in the embodiment shown, includes the end portion 11 and the body portion 12 between which an annular shoulder 13 is formed; and the portion 12 is provided near the shoulder 13 with an outwardly projecting pin 14. Surrounding the portion 12 is a tubular bushing 15′ (Fig. 6) the ends of which are slotted at 17 and 18, one pair of the slots preferably being in a plane at right angles to the plane of the other pair, and it will be seen (Fig. 3) that the pin is received in one of the slots 17, thus holding the bushing from turning. The bushing is retained by the washer 20 and nuts 21.

Were no means provided to prevent it, the fine grains of material abraded from the wheel would quickly get into the joint between the member 8 and the bushing and cut out the bearing. Ordinary packing, such as felt, might be inserted into the cup shaped elements 15 but the friction of the flanges 16 thereon would soon tear the material to pieces. It is therefore preferred to use at each end a pair of thin metal washers 22 between which the felt or other relatively soft compressible material 23 is received. These washers each include an inwardly extending projection 24 (Fig. 11) those on the end nearest the shoulder being received in the slot 17 other than that into which the pin projects. At the opposite end the projections may be received in either one or the other or both of the slots 18, and it is evident that one of the slots 18 might be omitted. It is also evident that a somewhat similar action, in so far as protecting the packing is concerned, would take place were the projections 24 omitted from those washers which are farthest from the flanges 16, but the latter construction is not desirable since the washers referred to might then be carried around by the housing members 15. When all the washers are held from rotation, either as shown or in an equivalent manner, relative movement takes place along the faces of the flanges 16, and the packing is forced outwardly into close sealing relation to the inner surfaces of the cups 15 as the nuts 21 are tightened. A slight clearance is provided between the washer 20 and the bushing to allow for adjustment.

While the particular form of housing or support in which the spindle is carried is subject to considerable variation, it is preferred to include therein a hood 25 having a perforated end 26 into which the end 11 of the spindle is pressed. A handle 28 threaded into the housing may be clamped into a tool rest or held in the hands of the user, but in either event the fact that one end of the housing is open allows the tool to be passed entirely across the face of the wheel in many instances where it would be impossible to do so on account of the obstructions which would be encountered were the open end of the housing closed by a wall similar to the wall 26. The tool may therefore also be used to dress the side faces of the wheel close down to the nuts whereby the latter is clamped on its spindle.

In order to insure proper lubrication and to further prevent the entrance of emery dust or other foreign material into the bearings, the spindle is bored out to form a chamber 30 that communicates with the inner surface of the cutter through the passages 31 and 32. The outer end of the chamber is provided with a screw plug 33. Lubricating fluid is supplied to the chamber through a lateral passage 34 from an ordinary grease cup 35 which is threaded into the end wall of the housing. When the compression screw 36 of the cup is turned, sufficient pressure is applied to the fluid to cause it to tend to work out between the packing and the inner surfaces of the elements 15 thus preventing the entrance of any particles of foreign matter that may collect around the end of said elements.

The bearing features and the lubricating features above described are applicable to devices other than dressing tools, in fact, generally in the arts, and are therefore claimed in our co-pending application, Serial Number 220,976, filed March 7th, 1918.

The details of construction are subject to considerable variation otherwise than as stated and we do not wish, therefore, to be limited except as indicated by the claims:

We claim:—

1. A dressing tool comprising a rotatable spool-like dressing implement having teeth thereon, a fixed spindle about which the implement turns, and means for supporting the spindle entirely from one end.

2. A dressing tool comprising a rotatable spool-like dressing implement having outwardly projecting teeth thereon arranged in circumferential sets, a fixed spindle about which the implement turns, and combined means for supporting the spindle entirely from one end and for forming a hood whereby chips are prevented from striking the user of the tool.

3. A rotatable element comprising a tubular member having a plurality of substantially helical grooves in its outer surface, a plurality of toothed metal disks through which the tubular member passes, said disks including inwardly extending projections, the projections on adjacent disks being received in different grooves.

4. A rotatable working element of a tool comprising a tubular member having a plurality of restraining surfaces arranged to form helices spaced apart about the axis of the tubular member on the outer surface thereof, a plurality of toothed metal disks through which the tube passes, the angle between the helices being different from that between adjacent teeth on the disks, the disks each including a restraining surface adapted to coöperate with the first named restraining surfaces to prevent the corresponding disk from turning about the tubular member, the restraining surfaces on adjoining disks coöperating with the restraining surfaces of different helices on the tubular member.

5. A rotatable working element for a tool comprising a rotatable tubular member and a plurality of perforated disks thereon, the tubular member including as an integral part thereof an outwardly turned end flange, and a cup shaped bearing housing in which said end flange is received.

6. A rotatable working element for a tool comprising a rotatable tubular element having an outwardly extending flange at one end, a cup-shaped housing through which the tubular element passes, the body portion of the housing extending outwardly beyond the end of the rotatable element to form a chamber adapted to receive a washer adapted to exclude dirt from the joint between the tubular element and a shaft on which it may be mounted.

7. A rotatable working element of a tool comprising a tubular member having a restraining surface arranged to form a helix about the axis of the tubular member on the outer surface thereof, a plurality of toothed metal disks through which the tube passes, the disks each including a restraining surface adapted to coöperate with the first named restraining surface to prevent the corresponding disk from turning about the tubular member.

8. A dressing tool including a hood-forming member having a perforated end, a spindle having a portion of relatively large diameter fixed in the perforation in said end and supported solely thereby, said spindle having a collar adjacent the inner surface of said end, and a dressing implement supported by and rotatable on the spindle.

JOHN E. HOY.
ROLAND P. PLACE.